Figure 3:
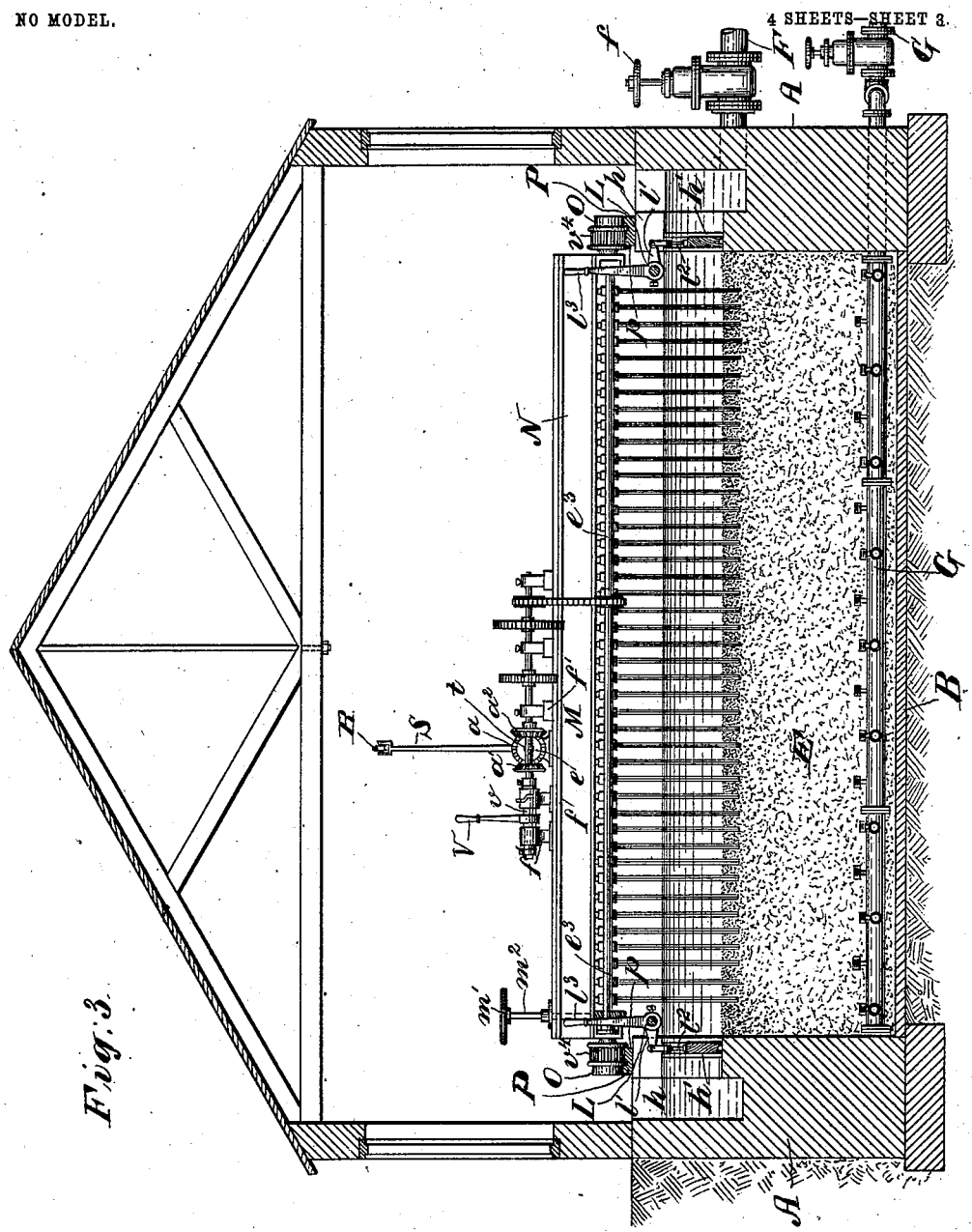

No. 722,581. PATENTED MAR. 10, 1903.
G. F. HODKINSON.
FILTER.
APPLICATION FILED MAY 11, 1900.
NO MODEL. 4 SHEETS—SHEET 1.
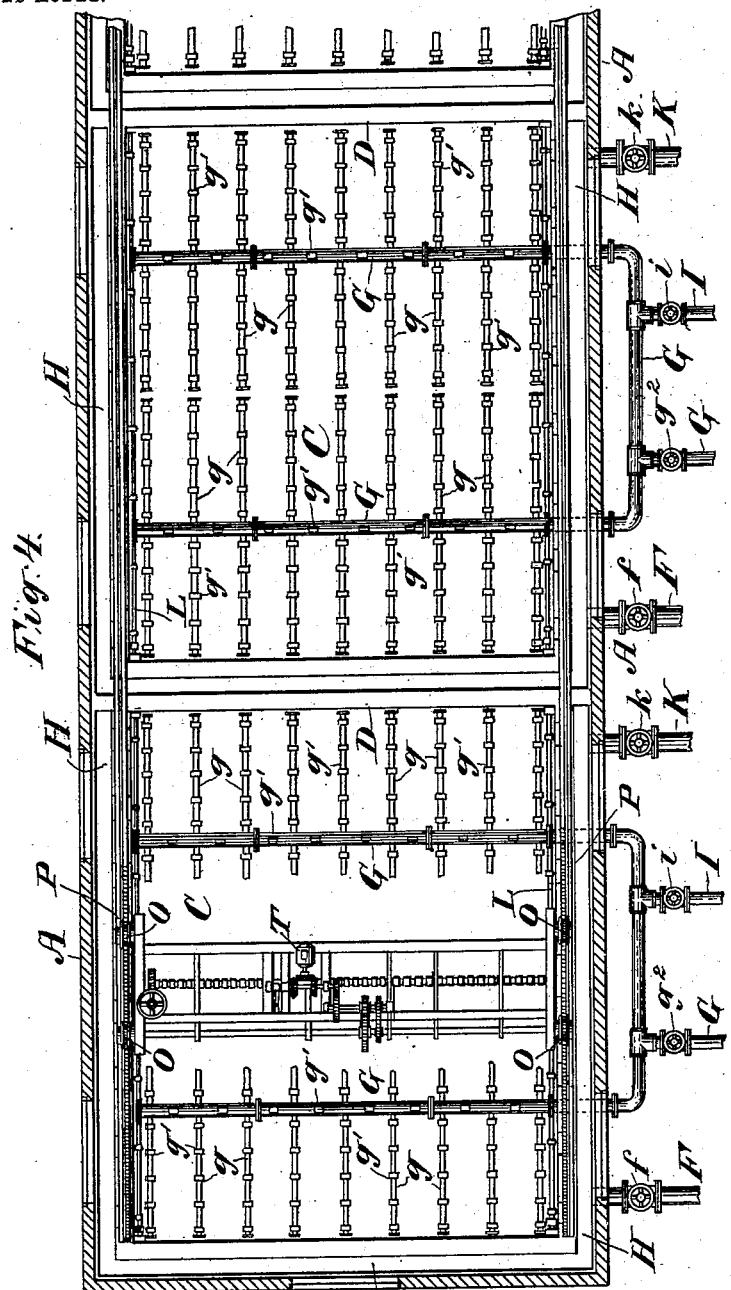
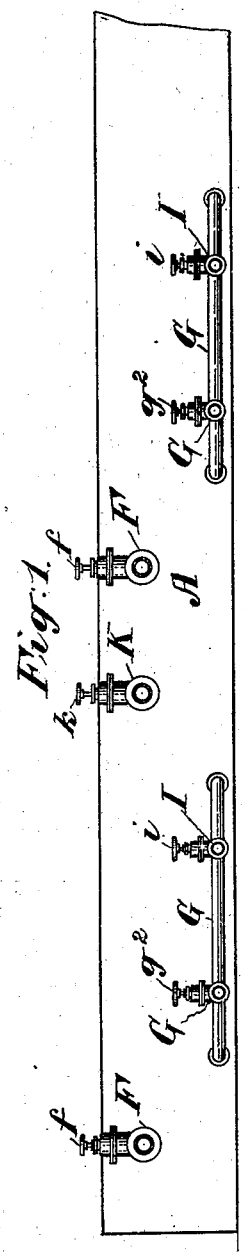
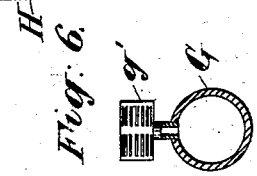
WITNESSES:
INVENTOR
George F. Hodkinson,
BY
ATTORNEY.

No. 722,581. PATENTED MAR. 10, 1903.
G. F. HODKINSON.
FILTER.
APPLICATION FILED MAY 11, 1900.
NO MODEL. 4 SHEETS—SHEET 2.
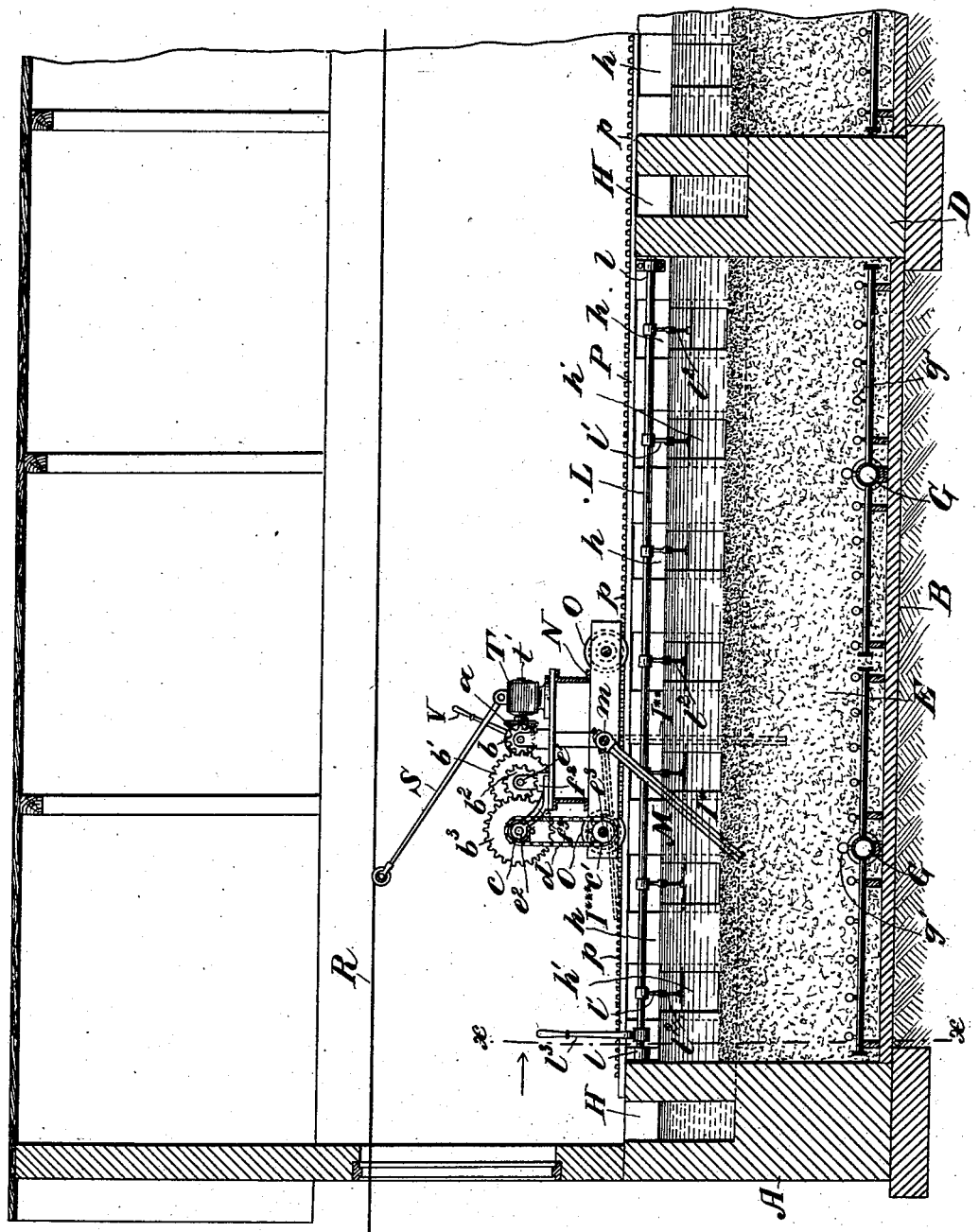
WITNESSES:
INVENTOR
George F Hodkinson,
BY
ATTORNEY.

No. 722,581. PATENTED MAR. 10, 1903.
G. F. HODKINSON.
FILTER.
APPLICATION FILED MAY 11, 1900.
NO MODEL. 4 SHEETS—SHEET 3.

WITNESSES:

INVENTOR
George F. Hodkinson,
BY
ATTORNEY.

No. 722,581. PATENTED MAR. 10, 1903.
G. F. HODKINSON.
FILTER.
APPLICATION FILED MAY 11, 1900.
NO MODEL. 4 SHEETS—SHEET 4.
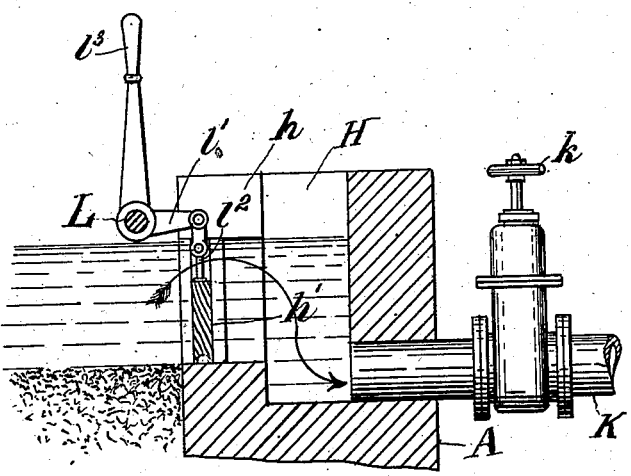
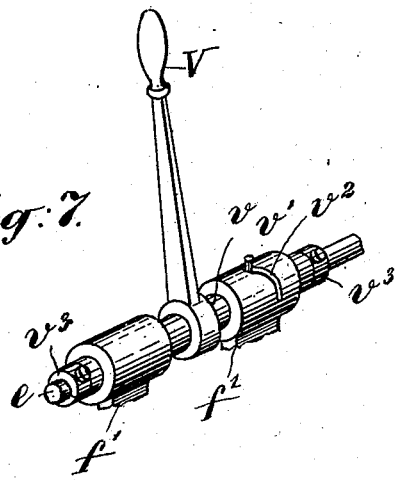
WITNESSES:
INVENTOR
George F. Hodkinson
BY
Wm H. Appleton
ATTORNEY

UNITED STATES PATENT OFFICE.

GEORGE F. HODKINSON, OF CHICAGO, ILLINOIS, ASSIGNOR TO THE NEW YORK CONTINENTAL JEWELL FILTRATION COMPANY.

FILTER.

SPECIFICATION forming part of Letters Patent No. 722,581, dated March 10, 1903.

Application filed May 11, 1900. Serial No. 16,247. (No model.)

*To all whom it may concern:*

Be it known that I, GEORGE F. HODKINSON, a citizen of the United States, and a resident of Chicago, in the county of Cook and State of Illinois, have invented certain new and useful Improvements in Water-Filters, of which the following is a specification.

In the supply of water to cities and other communities for culinary and other purposes it is usually the custom to employ in connection with the system adopted a filter, through which the water is passed on its way from the source of supply to the point of consumption, and this is especially the case where the water is more or less roily or carries with it other objectionable substances in mechanical suspension. These filters are of various kinds, the most common of which, however, usually consists of a suitable receptacle that is provided with a bottom and side walls of masonry or other appropriate material with a bed of sand and gravel of gradually-increasing coarseness from top to bottom or their equivalents disposed therein. As thus constructed and arranged the water to be filtered is delivered upon the top of the bed through pipes or other conductors and, passing down through the bed, is discharged at its bottom, whence it passes to the storage-reservoir or other point where required. In thus passing down through this bed the water parts with the substances carried by it in suspension in consequence of their inability to pass through the interstices between the grains of the sand and gravel, and the water freed from them and filtered passes on to its destination, leaving them behind therein. As thus charged by the constant flow of the water through it the bed in time becomes choked and contaminated by these substances, which in some cases, as where excessive or tenacious, form a film or crust upon its upper surface that is wholly or partially impervious to the water, and the cleansing and washing of the bed at frequent intervals become necessary. To accomplish this, the pipes or other conductors through which the water is delivered to and conducted from the filter during the filtering operation are closed, the film or crust upon the upper surface of the filter-bed, when formed, broken into small pieces by hand or otherwise, and a current of water then passed in a reverse direction up through the bed by delivering it at the bottom thereof through appropriate pipes or conductors and conducting it from its top, after it has traversed the mass, to a sewer or other waste-weir through similar means. As a result of this operation the objectionable substances taken up by the bed during the filtering operation, along with the broken film or crust formed upon its upper surface, are thoroughly removed and carried away to the place of discharge by the reversely-moving current and such bed thereby cleansed and renovated, after which the pipes or conductors through which the reversely-moving current is delivered to and conducted from the filter are closed, the other opened, and the filtering operation resumed, and so on. While thus the washing and cleansing of the filter-bed are effected by the current of water that is passed upward through the same, it is customary in some cases to employ in connection therewith various means by which the raking over and agitation of the sand and gravel are accomplished during the time that that operation is being conducted, to the end that the objectionable substances taken up by the bed may be more efficiently liberated by the water and carried away with it.

When the amount of water to be filtered is large, as when supplied to a city or other large community, it is found more or less undesirable to employ a single large filter because of the inconvenience experienced in thoroughly washing its entire surface and because of the fact that during such operation the entire supply of water to the city or other point of consumption is of necessity wholly suspended. To remedy this, therefore, a number of smaller filters are usually employed, which are severally provided with appropriate pipes or other conductors for conducting the water to and from them, whereby they are rendered individually capable of being brought into action to conduct the filtering operation or of being carried out of action and washed or cleansed without in any way interfering with the operation of any of the others. With each of the filters of this series a separate and distinct raking or agitating apparatus is employed, which, operated from any appropriate source of power, is made to traverse back and forth over the same, and thereby rake or agitate its bed when required. This arrangement, however, while efficient to a certain degree in operation, is found more or less objectionable in practice, principally because of the fact that as many agitating apparatus are required as there are filters employed, and as these either require a separate and distinct motor for each or a complicated system of shafting the cost of installation of a plant embodying them is greatly enhanced. To obviate this objection, therefore, and provide means whereby a single raking or agitating apparatus may be employed in connection with a number of filters, as well as to otherwise improve the construction of the filter and the raking or agitating apparatus themselves, are the objects of my invention.

To these ends the invention consists, first, in the construction of the raking or agitating apparatus; second, in the means by which the raking or agitating apparatus is mounted and operated; third, in the combination of a raking or agitating apparatus with a number of filters, whereby a single apparatus of that nature is rendered capable of use with each, and, fourth, in various other constructions and combinations of parts, principally of a subsidiary character, all as will hereinafter more fully appear.

Figure 8:
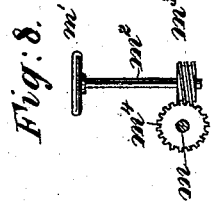

Referring to the accompanying drawings, which form a part of this specification, Figure 1 is a side elevation of a portion of a series of filters constructed in accordance with my invention and showing the arrangement of the pipes and valves for each of the constituent filters thereof; Fig. 2, a longitudinal vertical section of a portion of two filters with a raking or agitating apparatus constructed in accordance with my invention applied in connection therewith; Fig. 3, a transverse vertical sectional elevation thereof taken in the plane $x$ $x$ of Fig. 2 and looking in the direction of the arrow in that figure; Fig. 4, a plan view of the filters and raking or agitating apparatus, with the filter-beds omitted from the former; Fig. 5, a detail of one of the passage-ways and gates and a portion of the walls of one of the filters in which they are arranged; Fig. 6, a side elevation of one of the strainers that is arranged in the bottom of the filter-beds, with the pipes in which it is secured shown in transverse section; Fig. 7, a detail showing the connection of the raking or agitating apparatus operating lever with the shaft and bearings with which it coöperates, and Fig. 8 a detail showing the means by which the rake of the raking or agitating apparatus is adjusted.

In all the figures like letters of reference are employed to designate corresponding parts.

A indicates the side walls, and B the bottom, of a series of water-filters C, which are or may be constructed of brick, stone, or other appropriate material and of any approved form. I prefer, however, to construct them in rectangular form and to arrange them in a row, or, when numerous, in a number of rows that are disposed in parallel relationship to each other or one another, as the case may be.

Within each of the filters C is formed a filter-bed E, which is or may be composed of sand and gravel or other appropriate granular materials, that are arranged therein in the order of their fineness, with the largest or coarsest of their grains at the bottom and the progressively smaller or finer grains above in regular order to the top, where the finest grains are disposed. As thus constructed, the water to be filtered is delivered upon the top of this filter-bed and after having traversed the same is discharged from the bottom thereof. To permit of this being accomplished, I provide each of the filters near its top with a pipe F, which is connected with the source of the water-supply, and also near its bottom with a second pipe G, that is connected with the pipe or main leading to the point of consumption. Instead, however, of delivering the water directly from the pipes F upon the top of the filter-bed I preferably make use of a gutter H, into which it is discharged and from which it is delivered upon the top of the filter-bed. This gutter is conveniently formed in the upper edge of the filter-walls and preferably extends around three sides of the filter with its inner wall rising some distance above the top of the filter-bed, whereby the water accumulating therein from the pipe F is delivered upon the upper surfaces of the filter-bed along the front and back thereof, and the disarrangement of the upper surface thereof, due to the erosion incident to its rapid discharge at one point, thereby obviated. The pipe G, either as a whole or in divisions, on the other hand, extends inward across the bottom of each of the filter-beds and is provided at suitable points along the same with laterally-extending branches $g$, which, with the main pipe, are provided at the proper distances apart along their upper surfaces with strainers $g'$. The various filters C being thus constructed and equipped severally serve by themselves independently of the others to receive the water from the source of supply and after filtering it deliver it to the point of consumption, which operations when initiated may be continued until some or all of their respective beds have become so contaminated and clogged by the impurities separated out from the water and taken up by them in the filtering operation that the passage of the water through such beds is so retarded that the washing and cleansing of the latter become necessary. In order, therefore, to accomplish this, each of the filters C is provided near its bottom with a pipe I, which is connected with the source of water-supply, and also near its upper edge with a pipe K, which is connected with the gutter H and extends to a sewer or other waste-weir. By this means the washing of the filter-bed by the passing of a current of water upward through the same and thence to the sewer or other discharging-point is effected, and in order to permit of this being accomplished the supply-pipe F and discharge-pipe G are respectively provided with valves $f$ and $g^2$, which are first closed and the valves $i$ and $k$, with which the pipes I and K are respectively provided, then opened, when the water will enter at the bottom of the bed and passing up through the same cleanse and wash out all the impurities taken up by it, carrying them over into the gutter H and thence to the sewer or other point of discharge through the pipe K.

In those cases where from the excessive quantity or tenacious character of the impurities removed a film or crust has been formed upon the top of the filter-bed the breaking up and floating away of the same before the washing operation is commenced in some instances becomes necessary. To this end the inner walls of the gutter H at the front and back of each of the filters are provided with a number of passage-ways $h$, which extend therethrough, with their bottom edges approximately in line with the upper surface of the filter-bed, and are severally equipped with gates $h'$, which, fitted to open and close the lower portions thereof, are constructed of a height somewhat less than that of the passage-ways in which they are respectively disposed. In their normal condition, as when the filtering operation is in progress, the lower portions of these passage-ways are closed by the gates $h'$, and the water supplied by the pipe F to the gutter H in reaching the filter-bed flows over the tops of such gates. On the other hand, when the film or crust is to be carried away the lower portions of these passage-ways, after it has been broken, are opened and the broken portions thereof floated out through the same into the gutter H, whence they pass to the pipe K, and thence are discharged therethrough or otherwise removed. The disposition of this film or crust having been effected, the washing of the filter-bed by passing a current of water in a reverse direction up through the same may then be accomplished, prior to which, however, the lower portions of the passage-ways $h$ must be closed by the gates $h'$ in order that the water in thus passing up through the filter-bed on its way to the gutter H may be caused to rise to some considerable height above the upper surface of the bed and then flow over the tops of the gates, as shown by the course of the arrow in Fig. 5, whereby to obviate the danger of carrying away portions of the sand or other components of such bed with it that would be present if its flow to the gutter were beneath them. For operating these gates whereby to open and close the lower portions of the passage-ways $h$, as required, various means may be adopted. I prefer, however, to employ the shafts L for the purpose, with one of which the front and back of each of the filters is respectively provided and to accomplish the opening and closing of the lower portions of the passage-ways by raising and lowering the gates therein. To this end the shafts are severally mounted in suitable hangers $l$, that are secured to the walls or other convenient parts of their respective filters, with each of said shafts provided with laterally-extending arms $l'$, that are connected at their free ends with their respective gates through appropriate connecting-rods $l^2$, as shown. By this arrangement, as will be seen, the operation of all of the gates on either the front or back of any one of the filters may be effected in unison by simply oscillating their respective shaft L in the appropriate direction, which may be accomplished by a lever $l^3$, with which each of these shafts may be provided.

With a view to the breaking up of the film or crust when one is formed and the loosening up and agitation of the components of the filter-bed during the washing operation I make use of a rake M, comprising a series of pendulous stirrer-arms, and which is preferably supported and carried by a carriage N, that is capable of a traveling movement back and forth over the row or series of filters, whereby to permit of the use of a single rake and carriage therewith. To this end I provide the carriage with appropriate wheels O, which are adapted to run upon suitable rails P, that are supported upon the upper edge of the walls and extend from one end of the row of filters to the other, with one of these rails disposed near the front of the series and the other near the rear thereof. As thus supported the carriage, with its rake, extends over the filters from near their front to near their rear and may be moved over any one of the series and there operated by any appropriate power. In my preferred form of construction, however, I avail of an electric current for the purpose, which is or may be supplied through a suitable conductor R and trolley-arm S from any convenient source of electric supply to a motor T, that is mounted upon the carriage N and connected to one of the pairs of wheels O thereof by any appropriate means. The means whereby this connection is made, selected by me for the purpose of illustration, however, consists of the bevel-gears $a$, $a'$, and $a^2$, the spur-gears $b$, $b'$, $b^2$, and $b^3$, the sprocket-wheels $c$ and $c'$, and the sprocket-chain $d$. Of these the bevel-gear $a$ is secured to the shaft $t$ of the armature $t'$ and meshes with one or the other of the bevel-gears $a'$ and $a^2$, which, with the spur-gear $b$, are fixedly secured to the shaft $e$, that is mounted in suitable hangers $f'$, secured to the carriage N. The spur-gears $b'$, $b^2$, and $b^3$, on the other hand, are respectively secured to the shafts $e'$ and $e^2$, that are in like manner supported from the carriage N by the respective hangers $f^2$ and $f^3$, while the sprocket-wheels $c$ and $c'$ are respectively secured upon the shafts $c^2$ and $e^3$ and are connected by the endless sprocket-chain $d$. As thus connected and arranged the movement of the carriage, with its attached rake, back and forth over the filters C may be effected by bringing one and then the other of the gears $a'$ and $a^2$ into engagement with the gear $a$ in the required order, which may be accomplished by sliding their carrying-shaft $e$ longitudinally in its supporting-hangers $f'$ through the instrumentality of a lever V or otherwise. The connection of this lever with the shaft $e$ when employed may be effected in various ways. As shown in the drawings, however, it consists of a sleeve $v$, which, surrounding a portion of the shaft and mounted in the hangers $f'$, is provided with an outwardly-projecting pin $v'$, which engages with a spiral slot $v^2$, formed in one of such hangers, as shown more fully in Fig. 7. With the lever connected with the shaft, as thus described, the longitudinal movement of the latter may be effected by simply oscillating the sleeve $v$ in the required direction by the lever or otherwise when through its pin-and-slot connection with the hanger $f'$ a longitudinal movement will be imparted thereto, which in turn will be communicated to the shaft $e$ through the intervention of one or the other of the collars $v^3$ with which it is provided.

While the movements of the carriage N back and forth over the series of filters C are thus controlled, its positive movement along the tracks P are insured by the gears $v^4$, which are secured to the shaft $e^3$ at the proper distance apart and engage with the racks $p$, that are preferably supported upon the top of the walls beside the tracks and extend throughout the length of the series of filters over which the carriage travels.

When the breaking up of the film or crust on the filter-bed is required, the rake M will be so adjusted that its teeth will trail upon the surface of the filter-bed and not penetrate the same but to a slight extent and it will then occupy the position shown at 1* in Fig. 2. On the other hand, when the washing of the filter-bed is being effected and the components thereof are being harrowed or agitated it will occupy the position shown at 1 in that figure, while in passing with the carriage N from one filter to another over the intervening walls it will occupy the position shown at 1* therein. In order, therefore, to permit of its assuming and being positively held in those various positions, the rake instead of being fixedly secured to the carriage N is pivotally supported by a shaft $m$ and is adjustable with respect thereto by a hand-wheel $m'$, through the intermediaries of a shaft $m^2$, a worm $m^3$ thereon, and a worm-gear $m^4$ on the shaft $m$, with which such worm engages.

With the parts constructed and arranged as above described and with the gates $h'$ closed and the valves $f$ and $g^2$ opened the water from the source of supply will flow through the pipe F into the gutter H, thence over the tops of the gates $h'$ to the filter-bed, thence down through the same to the strainers $g'$ and be filtered thereby, and thence to the point of consumption through the pipe G. The operation thus indicated will continue until the filter-bed becomes clogged or otherwise contaminated by the objectionable matter taken up therein, when the washing of the same will become necessary. To effect this, the valves $f$ and $g^2$ will be closed, the valve $k$ opened, and the rake M brought over the particular filter to be washed and agitated and adjusted into the position shown at 1* in Fig. 2, in which it will be trailed over the filter-bed, breaking the film or crust thereon, which will then be floated out through the passage-ways $h$ beneath the gates $h'$, that have previously been raised, and thence to the waste-weir or other point of discharge. The removal of the film or crust having been thus accomplished, the gates $h'$ are then closed, the rake M adjusted into the position shown at 1 in that figure, the valve $i$ opened, and the rake traversed back and forth over the filter-bed, raking and agitating it as the water in passing up through it from the pipe I washes and cleanses the same on its way over the gates and along the gutter H to the waste-weir or other point of discharge through the pipe K. The washing and treating of the filter-bed thus described having been completed, the valves $i$ and $k$ will be closed, the rake M adjusted into the position shown at 1* in Fig. 2, and the valves $f$ and $g^2$ opened, when the filtering of the water will be again resumed and the rake M and carriage N moved to the next filter C where required, and so on.

It will thus be seen from the foregoing that I provide means whereby a single rake or agitating device may be employed in connection with a series of filters and be so adjusted as to permit not only of its being used to rake over or agitate their respective beds, but of being moved from one of the filters to another and positively held in the different positions to which it may be thus adjusted.

While in the foregoing I have described certain of the improvements made by me in the construction of the filters and in the means employed for conducting the water to and from them, I make no claim to those features herein, as the same form the subject of my patent dated February 12, 1901, and numbered 668,127; but, Having described my invention and specified certain of the ways in which it is or may be carried into effect, I claim and desire to secure by Letters Patent of the United States—

1. The combination, with the carriage, and the rake pivoted thereto and carried thereby, of devices for adjusting the rake to different positions with respect to the carriage and positively holding it in any one of the various positions to which it may be thus adjusted, substantially as described.

2. The combination, with a series of independent filters separated from each other by suitable partitions, tracks extending throughout the series, and a carriage mounted to travel upon such tracks, of a rake pivoted to such carriage, and means for adjusting the rake with respect to the carriage whereby it may be adjusted either to trail upon the surface of the filter-beds or to extend downward some distance therein to loosen up and agitate the same, or be raised to a sufficient height to permit of it passing over the partitions between the filters, substantially as described.

3. The combination, with a series of water-filters, and tracks extending throughout the length of the series with one of these tracks arranged near one side of said series and the other near the other side thereof, of a device for agitating and loosening up the material composing the filter-bed, a carriage by which this agitating device is supported and carried on said tracks and extending over said filters from near one of their sides to near their other, and a motor for propelling this carriage back and forth along the rails, whereby such agitating device may be moved to any one of the filters of the series and there operated to agitate the material of its filter-bed, and a single agitating device thereby made available for all of the filters thereof, substantially as described.

4. The combination, with a series of water-filters having side walls that extend from one end of the series to the other, and tracks extending throughout said walls, of a rake, a carriage by which it is supported and carried mounted on such tracks, an electric motor for propelling such carriage along the tracks, means for supplying a current to said motor, and devices through which the movement of the carriage may be controlled, whereby to carry the rake over any one of the filters of the series and there move it back and forth over its filter-bed to furrow or agitate the material thereof, substantially as described.

5. The combination, with a series of water-filters, tracks extending throughout the series, a carriage provided with wheels mounted thereon, and a rake pivoted to and supported by such carriage, of racks extending along the series, gears for engaging such racks, an electric motor, devices for operatively connecting this motor with said gears and for supplying an electric current to said motor, whereby the positive movement of the carriage and rake along the rails over the filters is effected, substantially as described.

6. An agitator for filter-beds comprising a support, a longitudinal series of pendulous stirrer-arms connected thereto and constructed to swing rearwardly and means for locking said arms rigidly with respect to the support and from both forward and rearward movement.

7. An agitator for filter-beds, comprising a support and a series of pendulous stirrer-arms connected therewith and capable of swinging past the vertical plane of the support in both directions.

8. An agitator for filter-beds, comprising a support and a series of pendulous stirrer-arms connected therewith and capable of swinging past the vertical plane of the support in both directions, and means for causing the same to penetrate the bed at variable depths, as desired.

9. An agitator for filter-beds, comprising a support and a series of pendulous stirrer-arms connected therewith and capable of swinging past the vertical plane of the support in both directions, and means for locking said arm rigidly with respect to the said support.

10. An agitator for filter-beds comprising a support, a longitudinal series of pendulous stirrer-arms connected therewith and worm-gear mechanism associated with the support to incline the arms rearwardly from the vertical.

11. A filtering plant comprising a series of filter units, a traveling agitator having arms which penetrate the bed more or less deeply, said arms being constructed to be raised above the level of the walls of the tanks containing the beds of the units whereby the device may be transferred from one filter unit to the other, and tracks or ways on which the agitator travels from one bed to the other.

12. A filtering plant comprising a series of filter units, a traveling agitator having arms which are designed to depend into the bed to agitate the same, tracks or ways on which the agitator travels from one bed to the other, said parts being constructed to be operated to bring the arms above the level of the walls of the units containing the beds whereby said agitator may be transferred from one bed to the other.

13. A filtering plant comprising a series of filtering units, a traveling agitator comprising a support spanning the bed, and pendulous stirrer-arms connected therewith and capable of swinging past the vertical plane of the support in both directions, and tracks or ways on which the agitator travels from one bed to the other.

In witness whereof I have hereunto set my hand this 8th day of April, 1900.

GEORGE F. HODKINSON.

Witnesses:
  A. G. CURTIS,
  JOHN DENSLOW.